United States Patent

Alexander et al.

[11] Patent Number: 5,822,111
[45] Date of Patent: Oct. 13, 1998

[54] APPARATUS AND METHOD FOR COHERENT ACOUSTO-OPTIC SIGNAL WIDTH MODIFICATION

[75] Inventors: Edward M. Alexander, Falls Church, Va.; John N. Lee, Silver Spring; Anthony E. Spezio, Laurel, both of Md.

[73] Assignee: The United States of America as represented by the Secretary of the Navy, Washington, D.C.

[21] Appl. No.: 492,270

[22] Filed: May 3, 1995

[51] Int. Cl.$^6$ .................................................. G02F 1/33
[52] U.S. Cl. .................................... 359/306; 359/285
[58] Field of Search ................................ 359/285, 305, 359/310, 311, 312, 306

[56] References Cited

U.S. PATENT DOCUMENTS

| | | | |
|---|---|---|---|
| 3,535,657 | 10/1970 | Webb | 332/164 |
| 4,110,016 | 8/1978 | Berg et al. | 359/310 |
| 4,579,421 | 4/1986 | Brown et al. | 359/310 |

*Primary Examiner*—David C. Nelms
*Assistant Examiner*—Dawn-Marie Bey
*Attorney, Agent, or Firm*—Thomas E. McDonnell; Edward F. Miles

[57] ABSTRACT

A apparatus and method for coherently stretching or compressing signals of interest, i.e. without loss of information. A first, or tapping, Bragg cell has an acoustic signal launched in it which is modulated onto a laser carrier. The signal of interest is launched into a second, or signal, Bragg cell, and is similarly modulated onto the carrier exiting the first Bragg cell. Upon demodulation, the resultant signal, is the convolution of the two acoustic signals in the respective Bragg cells, but whose duration is either stretched or compressed according to the relative velocity between the acoustic signals in the two Bragg cells, and by the magnification of optics between the two cells. If the signal in the first Bragg cell is of such a short duration that it is effectively an impulse, the resultant signal is a coherently stretched or compressed replica of the signal launched into the second Bragg cell, i.e. the signal of interest.

17 Claims, 2 Drawing Sheets

APPARATUS AND METHOD FOR COHERENT ACOUSTO-OPTIC SIGNAL WIDTH MODIFICATION

BACKGROUND OF THE INVENTION

A general problem in physics and engineering is coherent pulse stretching or compression. For example, many physical processes occur in such short periods of time that it would aid study of such a process to expand the physical record of the processes. Another example is synthesis of signals useful for repeater countermeasures to an imaging radar. Reflection of a radar pulse from an object such as a ship or airplane modulates the pulse in both amplitude and frequency, both of which is a consequence of the object having a multifaceted surface. A ship, for example, will have many flat reflecting bulkheads at differing distances from the outer hull. Each of these surfaces has a different microwave reflectivity, and the radar pulse will have differing round trip times to the various surfaces of the ship. In effect, the ship is a scatterer of the radar pulse, and its net reflection is a sum of the reflections from its various surfaces, i.e. a plurality of pulses of varying amplitudes and of varying time shifts with respect to one another.

To simulate such a complicated return signal, a repeater must take a signal from a hostile radar, and in response create an RF pulse return impressed with locally synthesized target modulation to simulate the RF pulse return from an extended target. RF Pulse stretching is known, but generally functions by storing RF energy during a given time and releasing it over a longer time. This technique increases the pulse's duration, but integrates the original signal, thus destroying information modulated onto it. An example of an integrating pulse stretcher is given in U.S. Pat. No. 3,535,657.

Further, it would be desirable to do the foregoing using optical technology, to secure the advantages of this technology, for example its relatively unlimited bandwidth.

SUMMARY OF THE INVENTION

Accordingly, an object of the invention is to permit inspection of physical events of short duration.

Another object is to permit synthesis of the radar signature of an extended target responsive to the receipt of a radar pulse.

Another object is to permit coherent stretching or compressing of signals.

Another object is to do the foregoing using optical techniques.

In accordance with these and other objects made apparent hereinafter, the invention concerns a technique for stretching or compressing a signal of interest using a first and a second Bragg cell. The signal is launched into the second Bragg cell, and another signal, called a tapping signal, is launched into the first Bragg cell. A coherent light beam is directed at the first Bragg cell, causing the tapping signal to diffract a portion of the coherent light beam. The diffracted beam is directed to the second Bragg cell, causing the signal of interest to diffract a further portion of the light beam.

The resultant light beam output from the second Bragg cell constitutes an optical carrier, onto which both the amplitude and frequency information of the acoustic signals in both Bragg cells are impressed. Upon removal of the carrier, and demodulating the signal from the first Bragg cell, the output will represent the convolution of the signals in the Bragg cells. If the signal in the first cell is of sufficiently small spatial extent compared to variations on the intra pulse modulation of the signal of interest to be considered an impulse, then the output will be a replica of the signal of interest in the second cell. However, the width of the output pulse will depend on the relative velocity of the signals in the Bragg cells, and the optical magnification between the Bragg cells, permitting one to compress or stretch the signal of interest.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

BRIEF DESCRIPTION OF THE DRAWINGS

FIG. 2 is a schematic drawing illustrates the operation and results of the system of FIG. 1. In particular:

DETAILED DESCRIPTION

Figure 1:
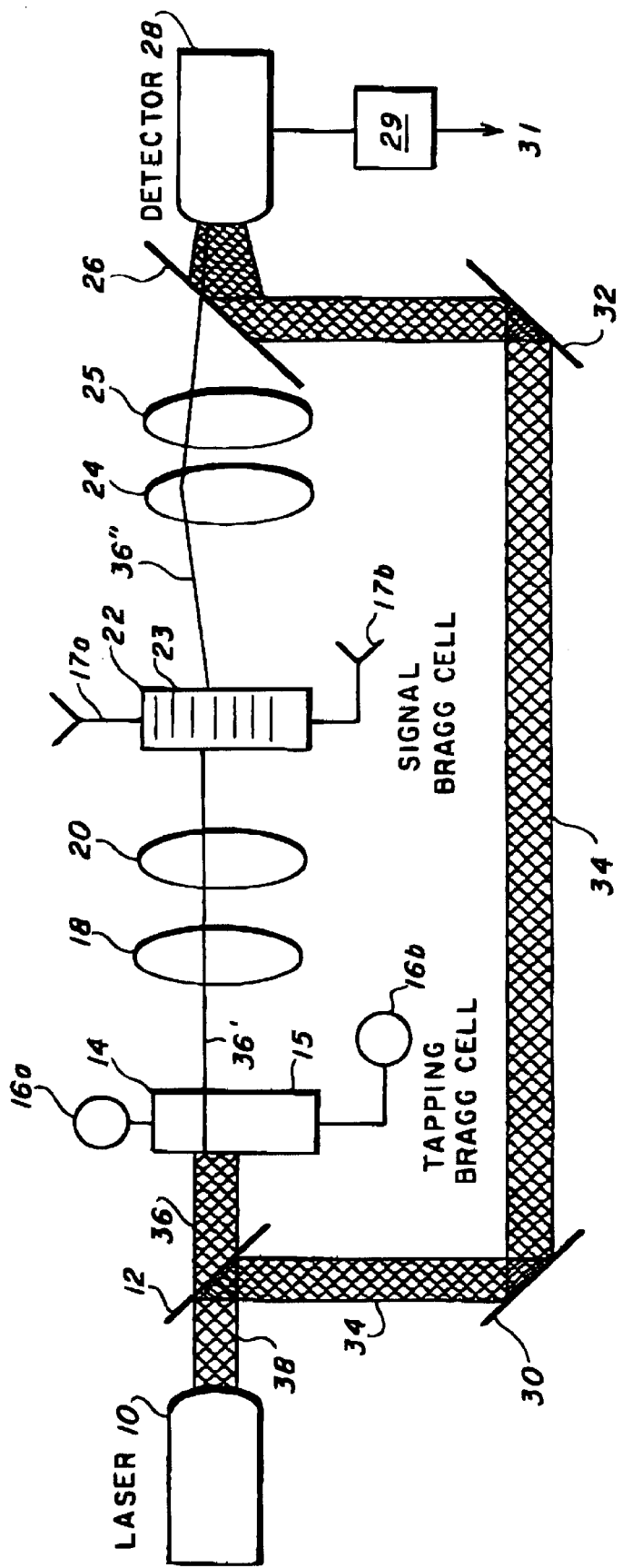
FIG. 1 is a schematic drawing illustrating an embodiment of the invention.
Figure 2A:
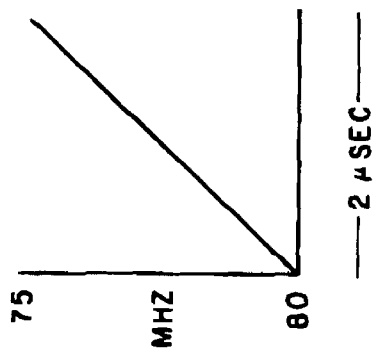
FIG. 2a shows the envelope of a pulse incident on the system of FIG. 1.
Figure 2B:
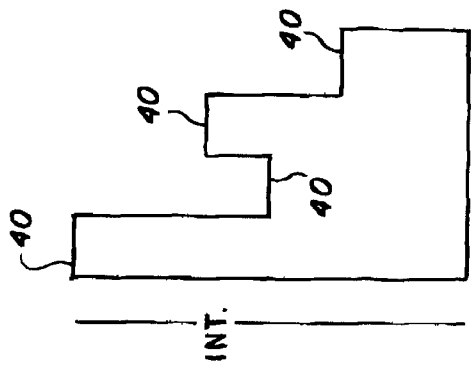
FIG. 2b shows stretching of that envelope by the system of FIG. 1.
Figure 2C:
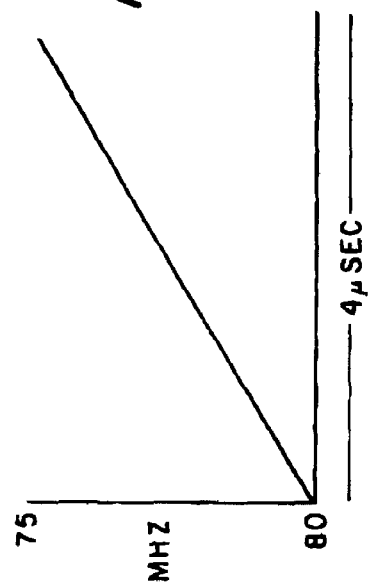
FIG. 2c shows the frequency variation of the pulse of FIG. 2a as a function of time, prior to operation of the system of FIG. 1.
Figure 2D:
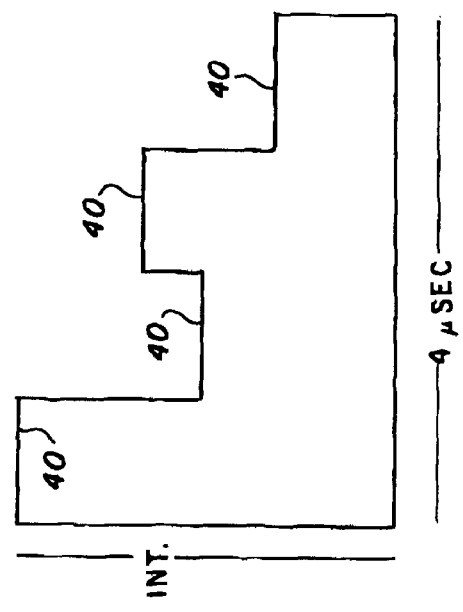
FIG. 2d shows stretching of that frequency variation by the system of FIG. 1.

With reference to the drawing FIGS, wherein like numbers indicate like parts throughout the several views, FIG. 1 shows a system according to the invention. Laser 10 emits an optical beam 38 directed to beamsplitter 12, which divides beam 38 into portions 34, 36, the latter of which impinges on tapping Bragg cell 14. Bragg cell 14 has an electro-acoustic transducer 16, which receives an electrical signal, preferably a short duration pulsed sinusoid, transduces it into a corresponding acoustic signal, and launches the acoustic signal so as to travel along Bragg cell 14 transverse to the direction of optical beam 36. FIG. 1 shows transducer 16 in two portions, 16a and 16b, at opposite ends of Bragg cell 14, which permits launching of acoustic signals in either direction transverse to beam 36. As an acoustic signal passes transverse to beam 36, it and beam 36 will spatially overlap in Bragg cell 14, permitting the acoustic signal and optical beam 36 to interact acousto-optically. The acoustic signal 15 in cell 14 effectively sets up a diffraction grating of spacing corresponding to the acoustic frequency of the signal in Bragg cell 14 which, as the acoustic signal passes by optical beam 36, splits beam 36 into an undiffracted and a diffracted portion, corresponding to the respective parts of beam 36 which did not, and did, interact with the acoustic signal. The optical intensity of the diffracted portion (beam 36' in FIG. 1) is proportional to the acoustic intensity of the acoustic signal 15 in Bragg cell 14. Further, the frequency of diffracted portion 36' is shifted by an amount equal to the acoustic frequency of signal 15 in cell 14. In this manner, optical beam 36' becomes an optical carrier, onto which is modulated both amplitude and frequency information contained in the acoustic signal.

Lenses 18, 20 collect the diffracted portion 36' of beam 36, and focuses it onto signal Bragg cell 22. (The undiffracted portion of beam 36 exits cell 22 at a different angle from beam portion 36', and is removed from the system by any conventional means, for example by insertion of an opaque shutter.) Preferably, lenses 18, 20 are chosen to focus beam 36' telecentrically, to ensuring that the wavefront of beam 36' is planar, to match the planar surface of Bragg cell 22 at which beam 36' arrives, and thus ensure greater optical throughput.

Electro-optic transducer 17, like transducer 16, delivers an electric signal to Bragg cell 22 which is launched into cell 22 as a corresponding acoustic signal 23. The signal at 17 is preferably one containing information of interest, e.g. a RF communication signal, a radar return, or more generally any electric signal containing information of interest. Cell 22 is disposed so that acoustic signal 23 and optical input 36' intersect, and travel along the same linear path (i.e. either in the same, or in the opposite, direction) so that they interact along the active length of the acoustic crystal in cell 22. As with cell 14, Bragg cell 22 splits optical beam 36' into diffracted and undiffracted portions, and lenses 24, 25 are disposed to collect diffracted portion 36", ultimately directing it to optical plate 26. (As with the output from cell 14, the other portion is removed from the system.) Resultant beam 36" is an optical pulse having a duration equal to the time signal 23 and beam 36' interacted, i.e. spatially overlapped at Bragg cell 22, and being frequency and amplitude modulated by acoustic signal 23. Lenses 24, 25 are preferably chosen to focus beam 36" telecentrically onto optical plate 26, so that the wavefront of optical beam 36" matches the flat geometry of photodetector 28, for maximum system throughput.

Beamsplitter 12 directs the other portion 34 of laser output 38 to optical plate 26 via mirrors 30, 32, so as to heterodyne beam 36" and beam 34 to remove the optical carrier from beam 36". Conventional electro-optic detector 28 detects the resultant signal and produces a corresponding electrical output. Preferably (and not shown in the drawing figure), mixer 29 beats the output of detector 28 with a sinusoid of the same frequency as the pulsed sinusoid in Bragg cell 14, to remove the frequency modulation imposed by cell 14 (or, more to the point, the center frequency of the truncated sinusoid in Bragg cell 14).

From the foregoing, one can see that the output 31 of mixer 29 is an electric signal representing the convolution of the acoustic signals in Bragg cells 22 and 14, i.e. the signal which results from these two signals being shifted and multiplied. As mentioned above, the acoustic signal in Bragg cell 14 is preferably a pulsed sinusoid. If its pulse duration is small with respect to variations in acoustic signal 23, then the acoustic pulse in cell 14 is effectively an impulse with respect to signal 23, and output 32 is identical to acoustic signal 23 with one exception: the duration of any signal at 32 is the time during which beam 36' and acoustic signal 23 overlapped in Bragg cell 22. If the acoustic signals in Bragg cells 14, 22 travel in the same direction, telecentric lens array 18, 20 causes beam 36' and acoustic signal 23 to travel in opposite directions along the length of Bragg cell 22, increasing their relative velocities and correspondingly decreasing the time that they interact in cell 22, thus correspondingly decreasing the duration of output 31. Conversely, if the acoustic signals in cells 14, 22 travel in opposite directions, lens array 18, 20 causes beam 36' and acoustic signal 23 to travel in the same direction, correspondingly decreasing their relative velocity and increasing their interaction time, and correspondingly increasing the signal duration at 31. In this manner, the system of FIG. 1 can act as either a stretcher or compressor of pulses which appear at transducer 17. Because the duration of the acoustic pulse launched by transducer 16 is small with respect to time variations of signals from transducer 17, the stretching/compression is coherent, and all information contained in a signal appearing at transducer 17 will be present in the stretched/compressed output at 31. One can further control the relative velocities of beam 36' and signal 23, and hence further control the amount of stretching or compression at 31, by selection of the focal lengths and the placement of lenses 18, 20 to selectably control the length of the optical image of Bragg cell 22. In general, the velocity $V_T$ of the image from cell 14 along the acoustic column of cell 22 is:

$$V_T = -V_o d_i / d_o$$

where $V_0$ is the velocity of the acoustic signal in Bragg cell 14, $d_o$ is object distance (i.e. the distance from Bragg cell 14 to lens 18), and $d_i$ is image distance (i.e. the distance between Bragg cell 22 and lens 20). The ratio $d_i$ to $d_o$ is simply the magnification of lens array 18, 20. The pulse width $T_o$ of Bragg cell 22 is related to the pulse width $T_I$ of the input at cell 22, i.e. the width of the pulse imaged onto cell 22, by:

$$T_o = T_I V_S / (V_S - V_T)$$

where $V_S$ is the acoustic velocity in Bragg cell 22. Pulse stretching requires that $V_S$ and $V_T$ be in the same direction, whereas pulse compression requires that $V_S$ and $V_T$ be in opposite directions, although the degree of stretching or compression can be modified by varying $V_T$ by varying magnification $d_i/d_o$. Although the embodiment of FIG. 1 uses telecentric lenses 18, 20, any optical scheme which images the output of cell 14 onto cell 22 will do, although this will be less efficient, for reasons discussed above. The same is true also of lenses 24, 25.

FIG. 2 illustrates schematically the operation of the system of FIG. 1 for an amplitude modulated, chirped, sinusoidal pulse such as might appear at transducer 17. For this example, Bragg cells 14, 22 are assumed substantially identical, so that the acoustic velocities of their acoustic crystals are essentially identical, and that transducers 16, 17, launch signals into the cells to cause pulse stretching. FIGS. 2a and 2c represent a chirped, amplitude modulated, sinusoidal pulsed signal such as might appear at transducer 17, and be launched into Bragg cell 22 as acoustic signal 23. Its duration is 2 μsec, and has amplitude modulation peaks and troughs 40. FIG. 2c illustrates linear chirping of the pulse's frequency during its 2 μsec duration from 30 to 75 Mhz. FIG. 2b shows the corresponding pulse envelope which would appear at output 31: one which retains the same amplitude shape, and hence all amplitude modulated information, but whose duration has doubled to 4 μsec. Similarly, as illustrated in FIG. 2d, time in which the pulse's frequency has ramped from 30 to 75 Mhz has doubled from 2 to 4 μsec.

The invention has been described in what is considered to be the most practical and preferred embodiments. It is recognized, however, that obvious modifications to these embodiments may occur to those with skill in this art. Accordingly, the scope of the invention is to be discerned from reference to the appended claims, wherein:

We claim:

1. An acoustic optic apparatus comprising:

a first and a second Bragg cell, each said cell adapted to have respective acoustic signal launched therein;

wherein said Bragg cells disposed to cause;

said respective acoustic signals to propagate in a direction substantially parallel to one another; and light traversing said first Bragg cell transverse to said direction also traversed said second Bragg cell transverse to said direction;

and wherein said acoustic signal in said first Bragg cell is selected to be a pulse of sufficiently short duration to make said pulse effectively an impulse with respect to said acoustic signal in said second Bragg cell.

2. An apparatus for stretching or compressing a signal of interest, comprising:

a first and second Bragg cell;

means for launching said signal into said second Bragg cell;

means for launching a tapping signal into said first Bragg cell;

means for directing a coherent light beam at said first Bragg cell effective to cause said tapping signal to diffract a portion of said coherent light beam;

means for directing said portion of said coherent light beam to said second Bragg cell effective to cause said signal of interest to diffract a further portion of said portion of said coherent light beam; and wherein said tapping signal is a tapping acoustic pulse;

said means for directing said portion of said coherent light beam to said second Bragg cell is effective to form an image on said second Bragg cell of said tapping signal; and the spatial width of said acoustic tapping pulse is smaller than at least some of the spatial variations of said signal of interest in said second Bragg cell.

3. The apparatus of claim 2, wherein said spatial width of said acoustic tapping pulse is smaller than all of the spatial variations of said signal of interest in said second Bragg cell.

4. The apparatus of claim 2, wherein said apparatus comprises a means, disposed optically between said first and said second Bragg cell, for magnifying said portion of said coherent light beam.

5. The apparatus of claim 4, wherein said means for magnifying is a telecentric lens system.

6. The apparatus of claim 4, wherein said means for magnifying is adapted effective to cause selectable variation in the relative velocity of said image on said second Bragg cell, and said signal of interest in said second Bragg cell, by selectably varying the magnification of said means for magnifying.

7. The apparatus of claim 2, wherein said means for launching said signal of interest, and said means for launching said tapping signal, are effective to launch each said signal substantially parallel to one another.

8. The apparatus of claim 7, wherein said each signal propagates substantially parallel to one another in the opposite direction.

9. The apparatus of claim 7, wherein said each signal propagates substantially parallel to one another in the same direction.

10. An apparatus for stretching or compressing a signal of interest, comprising:

a first and second Bragg cell;

means for launching said signal into said second Bragg cell;

means for launching a tapping signal into said first Bragg cell;

means for directing a coherent light beam at said first Bragg cell effective to cause said tapping signal to diffract a portion of said coherent light beam;

means for directing said portion of said coherent light beam to said second Bragg cell effective to cause said signal of interest to diffract a further portion of said portion of said coherent light beam; and means for detecting said further portion;

wherein said means for launching said signal of interest, and said means for launching said tapping signal, are effective to launch each said signal substantially parallel to one another wherein said each signal propagates substantially parallel to one another in the opposite direction.

11. An method for stretching or compressing a signal of interest, comprising:

launching a tapping signal into a first Bragg cell;

launching said signal of interest into a second Bragg cell;

directing a coherent light beam at said first Bragg cell effective to cause said tapping signal to diffract a portion of said coherent light beam;

directing said portion of said coherent light beam to said second Bragg cell effective to cause said signal of interest to diffract a further portion of said portion of said coherent light beam; and wherein said launching of said tapping signal is done effective to cause said tapping signal to be an acoustic pulse;

said directing of said portion of said coherent light beam to said second Bragg cell is done effective to form an image on said second Bragg cell of said tapping signal; and the spatial width of said acoustic tapping pulse is selected to be smaller than at least some of the spatial variations of said signal of interest in said second Bragg cell.

12. The method of claim 11, wherein said spatial width of said tapping pulse is smaller than all of the spatial variations of said signal of interest in said second Bragg cell.

13. The method of claim 11, further comprising magnifying said portion of said coherent light beam between said first and said second Bragg cell.

14. The method of claim 13, wherein said magnifying is done telecentrically.

15. The method of claim 13, wherein said magnifying causes selectable variation in the relative velocity of said image on said second Bragg cell, and said signal of interest in said second Bragg cell, by selectably varying the amount of said magnifying.

16. The method of claim 11, wherein said each signal is caused to propagate substantially parallel to one another in the opposite direction.

17. An apparatus for stretching or compressing a signal of interest, comprising:

a first and second Bragg cell;

means for launching said signal into said second Bragg cell; means for launching a tapping signal into signal first Bragg cell;

means for directing a coherent light beam at said first Bragg cell effective to cause said tapping signal to diffract a portion of said coherent light beam;

means for directing said portion of said coherent light beam to said second Bragg cell effective to cause said signal of interest to diffract a further portion of said portion of said coherent light beam;

means for detecting said further portion;

wherein said apparatus comprises a means, disposed optically between said first and said second Bragg cell, for magnifying said portion of said coherent light beam; and wherein said means for magnifying is adapted effective to cause selectable variation in the relative velocity of said image on said second Bragg cell, and said signal of interest in said second Bragg cell, by selectably varying the magnification of said means for magnifying.

\* \* \* \* \*